United States Patent [19]

Sugawara et al.

[11] Patent Number: 4,902,771
[45] Date of Patent: Feb. 20, 1990

[54] IMIDO-MODIFIED UNSATURATED POLYESTER RESIN COMPOSITION

[75] Inventors: Yasuo Sugawara; Yuuji Aimono; Hatuo Sugitani, all of Hitachi, Japan

[73] Assignee: Hitachi Chemical Company, Ltd., Tokyo, Japan

[21] Appl. No.: 235,985

[22] Filed: Aug. 23, 1988

[30] Foreign Application Priority Data

Sep. 10, 1987 [JP] Japan ................................ 62-226866
Mar. 18, 1988 [JP] Japan .................................. 63-66411

[51] Int. Cl.$^4$ ............................................ C08G 63/02
[52] U.S. Cl. .................................... 528/272; 528/289;
528/295.3; 528/295.5; 528/296; 528/303;
528/304; 528/306; 528/308; 528/322; 528/332;
528/392; 525/55; 525/165; 525/167.5; 525/168;
525/171; 525/172; 525/173; 525/174
[58] Field of Search ............... 528/272, 289, 295.3,
528/295.5, 296, 303, 304, 306, 308, 322, 332,
392; 525/55, 165, 167.5, 168, 171, 172, 173, 174

[56] References Cited

U.S. PATENT DOCUMENTS

| | | | |
|---|---|---|---|
| 3,729,446 | 4/1973 | Holub et al. | 526/262 |
| 4,375,528 | 3/1983 | Lange | 524/538 |
| 4,446,301 | 5/1984 | Belote et al. | 528/295.3 |

Primary Examiner—Morton Foelak
Assistant Examiner—Samuel A. Acquah
Attorney, Agent, or Firm—Frishauf, Holtz, Goodman & Woodward

[57] ABSTRACT

An imido-modified unsaturated polyester resin composition comprising an imido-modified unsaturated polyester obtainable by reacting an animal or vegetable fat and oil or a fatty acid thereof, an imido alcohol obtainable from a primary amino-alcohol and a polybasic acid anhydride, a polyhydroxy alcohol, and a polybasic acid in such a manner that the imido alcohol is used in an amount of 10 to 60% equivalent amount based on the alcoholic components; and a polymeric monomer.

In one of the preferred embodiments, the composition according to the present invention further contains an inorganic filler.

According to the present invention, there can be provided resin composition in which the compatibility under heat deterioration when used in enamelled wires has been improved, while maintaining excellent electrical and mechanical properties. When the present resin composition further contains an inorganic filler, not only compatibility under heat deterioration but also the thermal conductivity and corona-resistance have been improved.

22 Claims, No Drawings

IMIDO-MODIFIED UNSATURATED POLYESTER RESIN COMPOSITION

BACKGROUND OF THE INVENTION

This invention relates to an imido-modified unsaturated polyester resin composition usable for coil-impregnation, electric wire-coating, casting, adhesives in a transform built in domestic electric devices, computors, office automation instruments, etc.

Recently, insulating varnishes with improved heat resistance and improved mechanical properties have increasingly been required, as electric devices have become miniatuarized and lightened and as working conditions have been made severe. Conventional heat resistant compositions usable for coil-impregnation include silicone-, diphenyl ether- and polyamide types. However, all of these are solvent type-varnishes, which require troublesome and lengthy processing for varnish-treatment. For a polyamidoimido-type varnish, there may be used only a polar solvent such as N-methylpyrrolidone and N,N-dimethylacetamide, which are expensive, and there has been a fear that these solvents have an adverse influence on insulating materials used in electric instruments due to their high solvency power. As heat-resistant resins other than those described above, there have been known an imido-modified unsaturated polyester resin obtainable by incorprating into an unsaturated polyester system an imido compound obtained by reacting a polyvalent carboxylic acid anhydride such as trimellitic anhydride and pyromellitic dianhydride with a diamine in an organic solvent, in which heat resistance has been improved as compared with conventional unsaturated polyester resins (Japanese Patent Publication No. 28509/1980). In addition to the above described resins, there has been known an imido-modified unsaturated polyester resin, whose heat resistance has been improved by employing a divalent glycol compound having an imido group in the molecule as one of the components of the polyhydroxy alcohol during synthesis of the unsaturated polyester (Japanese Patent Publication No. 8995/1976). However, these resins can only be prepared according to a complicated synthesis process in which an imido compound is first synthesized and an unsaturated polyester is then synthesized as a part of an alcohol or an acid. Therefore, the resulting imido-modified unsaturated polyester resins cannot be said to sufficiently satisfy the present commercial requirement, although the heat resistance thereof has been improved. Polyhydroxy alcohol component other than those described above include an imido-modified polyester resin in which tris-(2-hydroxyethyl)isocyanurate is reacted therein, as a polyhydroxy component (Japanese Patent Publication No. 33146/1970).

There has also been known a saturated polyester in which a divalent alcohol functioning as the polyhydroxy alcohol component and having an imido ring, obtainable by a reaction of 1,2,3,4-butanetetracarboxylic acid or an acid anhydride thereof with an amino-alcohol is reacted singly or in combination with another alcohol (Japanese Unexamined Patent Publication No. 72296/1973). However, the technique described above is only applicable to a varnish for an enamelled copper wire and it is impossible to apply such a technique to a varnish for coil-impregnation due to insufficient compatibility with a polymeric monomer.

Any of the unsaturated polyester resins described above cannot be said to have sufficient compatibility under heat deterioration when used in enamelled wires, although the heat resistance thereof has been improved.

SUMMARY OF THE INVENTION

This invention is intended to provide an imido-modified unsaturated polyester resin composition in which compatibility under heat deterioration when used in enamelled wires has been improved as compared with conventional unsaturated polyester resins, while maintaining excellent electrical and mechanical properties which would be imparted by the conventional unsaturated polyester resins. This invention is further intended to provide an imido-modified unsaturated polyester resin composition in which not only the compatibility under heat deterioration described above but also the thermal conductivity and corona-resistance have been improved.

This invention relates to an imido-modified unsaturated polyester resin composition comprising an imido-modified unsaturated polyester obtainable by reacting an animal or vegetable fat and oil or a fatty acid thereof, an imido alcohol obtainable from a primary amino-alcohol and a polybasic acid anhydride, a polyhydroxy alcohol, and a polybasic acid in such a manner that said imido alcohol is used in an amount of 10 to 60 equivalent amount % based on the alcoholic components; and a polymeric monomer.

DESCRIPTION OF THE PREFERRED EMBODIMENTS

In one of the preferred embodiments, the resin composition according to the present invention further contains an inorganic filler.

The materials to be used in the present invention will be described below.

As the animal or vegetable fat and oil or a fatty acid thereof, although not particularly limited, there may be used, for example, whale oils, bean oils, bean oil fatty acids, castor oils, dehydrated castor oils, dehydrated castor oil fatty acids, tall oil fatty acids, linseed oil, rice bran oil fatty acids, etc.

As the primary amino-alcohols, although not particularly limited, there may be used, for example, monoethanolamine monomethylamino-alcohol, 2-amino-2-methyl-1-propanol, tris(hydroxymethyl)aminomethane, 2-amino-2-ethyl-1,3-propanediol, etc.

As the polybasic acid anhydrides to be reacted with the primary amino-alcohol to prepare an imido-alcohol, although not particularly limited, there may be used, for example, trimellitic anhydride, pyromellitic anhydride, benzophenone-2,3,2', 3'-tetracarboxylic acid dianhydride, 3,3', 4'4'-diphenyltetracarboxylic acid dianhydride, phthalic anhydride, tetrahydrophthalic anhydride, hexahydrophthalic anhydride, methylhymic anhydride, maleic anhydride, itaconic anhydride, citraconic anhydride, fumaric anhydride, etc.

As the polyhydroxy alcohols, although not particularly limited, there may be used, for example, ethylene glycol, diethylene glycol, propyrene glycol, 1,3-propanediol, 1,3-butanediol, 2,3-butanediol, hexamethylene glycol, neopentyl glycol, 1,6-hexanediol, glycerine, trimethylolethane, trimethylolpropane, pentaerythritol, tris-2-hydroxyethyl isocyanurate, etc.

As the polybasic acid, although not particularly limited, there may be used phthalic acid, maleic acid, fumaric acid, etc., in addition to the polybasic acid anhydrides described above for the polybasic acid anhydride to be reacted with the primary amino-alcohol.

In the present invention, the imido-alcohol may be used in an amount ranging between 10 to 60 equivalent amount %, more preferably 20 to 50 equivalent amount %, based on the alcoholic components (the imido-alcohol and the polyhydroxy alcohol). When the amount of the imido-alcohol is less than 10 equivalent amount %, the heat-resistance of the cured product is not sufficient and also inferior in compatibility under heat-deterioration when used in enamelled wires. When the amount of the imido-alcohol is in excess of 60 equivalent amount %, the cured product exhibits improved property, but is inferior in compatibility under heat deterioration when used in enamelled wires, poor in compatibility with polymeric monomers and extremely high in its viscosity. In both of these cases, the product becomes unsuitable as a varnish for impregnation.

As the polymeric monomers, although not particularly limited, there may be used, for example, styrene, vinyltoluene, α-methylstyrene, p-tert-butylstyrene, chlorostyrene, divinylbenzene, diaryl phthalate, methyl acrylate, methyl methacrylate, ethyl acrylate, ethyl methacrylate, lauryl acrylate, lauryl methacrylate, 2-hydroxyethyl acrylate, 2-hydroxyethyl methacrylate, 2-hydroxypropyl acrylate, 2-hydroxypropyl methacrylate, ethylene glycol diacrylate, ethylene glycol dimethacrylate, diethylene glycol diacrylate, diethylene glycol dimethacrylate, 1,6-hexanediol diacrylate, 1,6-hexanediol dimethacrylate, trimethylolpropane triacrylate and trimethylolpropane trimethacrylate, etc.

The above mentioned materials may be used singly or as a mixture of two or more kinds thereof.

As the inorganic fillers, although not particularly limited, there may be used, for example, hydrated alumina, alumina, talc, quartz powder, fused quartz powder, calcium carbonate, magnesium carbonate, mica, etc. They may be used singly or as a mixture of two or more kinds thereof and materials having any particle size can be selected. Although there is also no limitation with respect to an amount of the inorganic filler to be added, they are preferably added in an amount ranging from 10 to 50 parts by weight in case of impregnation coil and in an amount ranging from 100 to 250 parts by weight in case of casting, based on 100 parts by weight of the imido-modifiedpolyester resin and the polymeric monomer.

In curing of the imido-modified unsaturated polyester resin accroding to the present invention, there may be employed a radical polymerization initiator, for example, an organic peroxide which may be used for a conventional unsaturated polyester resin, as exemplified by benzoyl peroxide, acetyl peroxide, di-tert-butyl peroxide, dicumyl peroxide, tert-butyl perbenzoate, 1,1-di-tert-butyl-3,3,5-trimethyl peroxycyclohexanone, etc. If desired, there may be employed a curing-accelarating agent for the present resin composition, and a metallic drier as typically exemplified by an octenate salt or a naphtenate salt of cobalt, manganese or lead, for the purpose of improving the air-drying property. There also may be employed a polymerization inhibitor which may generally be used, such as hydroquinone, p-tert-butylcatechol, etc.

Alternatively, in addition to the above mentioned heat-curing method, a sensitizing agent can be added to effect the curing by ultra-violet ray in a short period.

Next, there will be given a formulation ratio of the materials for synthesizing the imido-modified-unsaturated polyester resin of the present invention.

The primary amino-alcohol and the polybasic acid anhydride are preferably used at a ratio of about one acid anhydride group in the polybasic acid anhydride to one amino group in the primary aminoalcohol.

The ratio of the acidic components (the polybasic acid and the animal or vegetable fat and oil or a fatty acid thereof) and the alcoholic components (the imido alcohol and the polyhydroxy alcohol) is preferably set so that the total number of carboxylic groups to the total number of hydroxy groups is in the range from 1/1.05 to 1/1.30, from view of smooth proceeding of the reaction. Further, it is preferable to use the polymeric monomer in an amount of 40 to 60 parts by weight based on 100 parts by weight of the imido-modified-unsaturated polyester.

The imido-modified-unsaturated polyester resin composition according to the present invention is one in which the compatibility under heat deterioration when used in enamelled wires has been improved, and further when an inorganic filler is incorporated therein, there can be obtained a resin composition in which not only the compatibility under heat deterioration but also the thermal conductivity and corona resistance property have been improved.

EXAMPLE

The present invention is described in more detail by referring to the following Examples, however, it is not limited thereto.

In the Examples, "parts" and "%" denote "parts by weight" and "% by weight", respectively.

Example 1

152 g (1 mole) of tetrahydrophthalic anhydride was stirred at 160° C. for 1 hour and at 180° C. for 3 hours while adding dropwise thereto 63 g (1 mole) of monoethanolamine and passing nitrogen gas therethrough, to obtain an imido alcohol having an acid value of 8. To 0.24 equivalent amount (hereinafter abbreviated as eq.) (47.2 g) of the imido alcohol thus obtained, 0.50 eq. (24.5 g) of maleic anhydride was added at 60° C. and the resulting mixture was reacted at 160° C. for 4 hours. After an acid value of 190 was confirmed, the temperature was lowered. Subsequently, 0.23 eq. (7.1 g) of glycerine, 0.22 eq. (7.1 g) of ethylene glycol and 0.08 eq. (21.6 g) of dehydrated castor oil were added thereto, and the resulting mixture was reacted for 2 hours at 160° C., followed by raising of the temperature to 210° C. over 3 hours. At this temperature the reaction was further continued until an imido-modified-unsaturated polyester having an acid value of 25 was obtained. The resulting polyester was dissolved in styrene so as to yield a styrene content of 40 %, to obtain a varnish. To 100 parts of the varnish thus obtained, 1.0 part of tert-butyl perbenzoate and 0.01 part (metal content : 8%) of manganese naphthenate were added to obtain Varnish A.

Example 2

152 g (1 mole) of tetrahydrophthalic anhydride was stirred at 160° C. for 1 hour and at 180° C. for 3 hours, while adding dropwise thereto 63 g (1 mole) of monoethanolamine and passing nitrogen gas therethrough, to obtain an imido alcohol having an acid value of 8. To 0.30 eq. (59.1 g) of the imido alcohol thus obtained, 0.50 eq. (24.5 g) of maleic anhydride was added at 60° C.

and the resulting mixture was reacted at 150° C. for 2 hours and at 160° C. for 2 hours. After an acid value of 185 was confirmed, the temperature was lowered. Subsequently, 0.23 eq. (7.1 g) of glycerine, 0.22 eq. (7.1 g) of ethylene glycol and 0.13 eq. (35.1 g) of dehydrated castor oil were added thereto, and the resulting mixture was reacted for 2 hours at 160° C., followed by raising the temperature to 210° C. over 3 hours. At this temperature the reaction was further continued until an imido-modified-unsaturated polyester having an acid value of 24 was obtained. The resulting polyester was dissolved in styrene so as to yield a styrene content of 40 %, to obtain a varnish. To 100 parts of the varnish thus obtained, 1.0 part of tert-butyl perbenzoate and 0.002 part (metal content : 8%) of manganese naphthenate were added to obtain Varnish B.

Example 3

To 0.12 eq. (23.4 g) of the imido alcohol obtained in Example 1, 0.4 eq. (19.6 g) of maleic anhydride was added at 60° C. and the resulting mixture was reacted at 155° C. for 3 hours. After an acid value of 190 was confirmed, the temperature was lowered. Subsequently, 0.5 eq. (43.5 g) of tris-2-hydroxyethylisocyanurate and 0.12 eq. (33.6 g) of bean fatty acid were added thereto, and the resulting mixture was reacted for 2 hours at 160° C., followed by raising of the temperature to 210° C. over 3 hours. At this temperature the reaction was further continued until an imido-modified-unsaturated polyester having an acid value of 25 was obtained. The resulting polyester was dissolved in styrene so as to yield a styrene content of 40 %, to obtain a varnish. To 100 parts of the varnish thus obtained, 1.0 part of tert-butyl perbenzoate and 0.002 part (metal content : 8%) of manganese naphthenate were added to obtain Varnish C.

Example 4

To 0.24 eq. (47.2 g) of the imido alcohol obtained in Example 1, 0.43 eq. (21.1 g) of maleic anhydride was added at 60° C. and the resulting mixture was reacted at 155° C. for 4 hours. After an acid value of 180 was confirmed, the temperature was lowered. Subsequently, 0.4 eq. (34.8 g) of tris-2-hydroxyethylisocyanurate and 0.11 eq. (30.8 g) of bean fatty acid were added thereto, and the resulting mixture was reacted for 2 hours at 160° C., followed by raising of the temperature to 210° C. over 3 hours. At this temperature the reactuon was further continued to obtain an imido-modified-unsaturated polyester having an acid value of 25. The resulting polyester was dissolved in styrene so as to yield a styrene content of 40 %, to obtain a varnish. To 100 parts of the varnish thus obtained, 1.0 part of tert.-butylperbenzoate and 0.002 part (metal content : 8%) of manganese naphthenate were added to obtain Varnish D.

The formulation ratio in terms of equivalent amount and the properties of the cured products of the varnish in Examples 1 to 4 are shown in Table 1.

TABLE 1

| | | Example No. | | | |
|---|---|---|---|---|---|
| | | 1 | 2 | 3 | 4 |
| Formulation ratio (equivalent amount) | Imido-alcohol | 0.24 | 0.30 | 0.12 | 0.24 |
| | Maleic anhydride | 0.50 | 0.50 | 0.40 | 0.43 |
| | Glycerine | 0.23 | 0.23 | — | — |
| | Ethylene glycol | 0.22 | 0.23 | — | — |
| | Tris-2-hydroxy-ethyl-isocyanurate | — | — | 0.50 | 0.40 |
| | Dehydrated castor oil | 0.08 | 0.13 | — | — |
| | Bean oil fatty acid | — | — | 0.12 | 0.11 |
| Physical properties of cured product | Decreased amount by heating at 240° C. after 10 days (%)*1 | 25 | 33 | 35 | 28 |
| | Heat resistance temperature (°C.)*2 Twist pair method | 202 | 203 | 221 | 217 |
| | Helical coil method | 223 | 222 | 222 | 222 |

The enamelled wire employed in the above measurement is IAI-EIW having a diameter of 1 mm.
*1 according to test criteria JIS C 2105.
*2 according to test criteria UL 1446.

The heat-resistance temperature of the cured products obtained in Examples were measured by use of the test criteria according to UL 1446. As a result, the heat resistance temperature (estimated at 20,000 hours) was found to be exceed 200° C. The present imido modified unsaturated polyester resin composition showed superiority in its compatibility under heat deterioration when used in enamelled wires.

Example 5

With 100 parts of the Varnish A obtained in Example 1, 20 parts of quartz powder (Aerojeal 380; produced by Japan Aerojeal Company) were formulated to obtain Varnish E.

Example 6

With 100 parts of the Varnish B obtained in Example 2, 40 parts of alumina (FA-4; produced by Showadenko Company) were formulated to obtain Vanish F.

Example 7

With 100 parts of the Vanish C obtained in Example 3, 230 parts of the alumina were formulated to obtain Varnish G.

Example 8

With 100 parts of the Vanish D obtained in Example 4, 10 parts of quartz powder (Aerojeal 380; produced by Japan Aerojeal Company) and 5 parts of mica powder (average particle size; 15 to 35 mesh) were formulated to obtain Varnish H.

The formulation ratio in terms of equivalent amount and the properties of the cured products in Examples 5 to 8 are shown in Table 2.

TABLE 2

|  |  | Example No. | | | |
| --- | --- | --- | --- | --- | --- |
|  |  | 5 | 6 | 7 | 8 |
| Formulation ratio (equivalent amount) | Imido-alcohol | 0.24 | 0.30 | 0.12 | 0.24 |
|  | Maleic anhydride | 0.50 | 0.50 | 0.40 | 0.43 |
|  | Glycerine | 0.23 | 0.23 | — | — |
|  | Ethylene glycol | 0.22 | 0.23 | — | — |
|  | Tris-2-hydroxy-ethyl-isocyanurate | — | — | 0.50 | 0.40 |
|  | Dehydrated castor oil fatty acid | 0.08 | 0.13 | — | — |
|  | Bean oil fatty acid | — | — | 0.12 | 0.11 |
| Physical properties of cured products | Decreased amount by heating at 240° C. after 10 days (%)*1 | 18 | 16 | 8 | 18 |
|  | Thermal conductivity coefficiency (cal/sec/cm$^2$/°C./cm) | $0.8 \times 10^{-4}$ | $0.7 \times 10^{-4}$ | $0.5 \times 10^{-4}$ | $0.8 \times 10^{-4}$ |
| Heat resistance temperature (°C.)*2 | Twist pair method | 203 | 205 | — | 222 |
|  | Helical coil method | 223 | 222 | — | 223 |

The enamelled wire employed in the above measurement is IAI-EIW having a diameter of 1 mm.
*1 according to test criteria, JIS C 2105
*2 according to test criteria, UL 1446

The heat-resistance temperature of the cured products pof the varnish obtained in Examples were measured by use of the test criteria according to UL 1446. As a result, the heat resistance temperature (estimated at 20,000 hours) was found to be exceed 200° C. The present imido modified unsaturated polyester resin composition is excellent in the compatibility under heat deterioration when used in enamelled wires and has large thermal conductivity coefficient. Thus it is possible for the imido-modified unsaturated polyester resin composition according to the present invention to contribute to the miniatuarization and lightening of apparatuses or instruments.

We claim:

1. An imido-modified unsaturated polyester resin composition comprising an imido-modified unsaturated polyester obtainable by reacting an animal or vegetable fat and oil or a fatty acid thereof, an imido alcohol obtainable from a primary amino-alcohol and a polybasic acid anhydride, a polyhydroxy alcohol, and a polybasic acid in such a manner that said imido alcohol is used in an amount of 10 to 60 equivalent amount % based on the alcoholic components; and a polymeric monomer.

2. The resin composition according to claim 1, wherein said resin composition further contains an inorganic filler.

3. The resin composition according to claim 1, wherein said animal or vegetable fat and oil is selected from the group consisting of bean oil fatty acid and dehydrated caster oil fatty acid.

4. The resin composition according to claim 1, wherein said primary amino-alcohol is monoethanol-amine.

5. The resin composition according to claim 1, wherein said polybasic acid anhydride to be reacted with said primary amino-alcohol is tetrahydrophthalic anhydride.

6. The resin composition according to claim 1, wherein said polyhydroxy alcohol is selected from the group consisting of glycerine and ethylene glycol.

7. The resin composition according to claim 1, wherein said imido alcohol is used in an amount of 20 to 50 equivalent amount % based on the alcoholic components.

8. The resin composition according to claim 1, wherein said polybasic acid is maleic anhydride.

9. The resin composition according to claim 1, wherein said polymeric monomer is styrene.

10. The resin composition according to claim 2, wherein said inorganic filler is quartz powder.

11. The resin composition according to claim 2, wherein said inorganic filler is used in an amount of 10 to 50 parts by weight in case of coil-pregnation and in an amount of 100 to 250 parts by weight in case of casting, based on 100 parts by weight of the imido-modified polyester resin and the polymeric monomer.

12. The resin composition according to claim 1, wherein said polybasic acid anhydride and said primary amino-alcohol are used at a ratio of one acid anhydride group in the polybasic acid anhydride to one amino group in the primary amino-alcohol.

13. The resin composition according to claim 1, wherein the total number of the carboxylic groups to the total number of the hydroxy groups in said composition is in the range from 1/1.05 to 1/1.30.

14. The resin composition according to claim 1, wherein said polymeric monomer is used in an amount of 40 to 60 parts by weight based on 100 parts by weight of said imido-modified unsaturated polyester.

15. The resin composition according to claim 3, wherein said primary amino-alcohol is monoethanolamine.

16. The resin composition according to claim 15, wherein said polybasic acid anhydride to be reacted with said primary amino-alcohol is tetrahydrophthalic anhydride.

17. The resin composition according to claim 16, wherein said polyhydroxy alcohol is selected from the group consisting of glycerine and ethylene glycol.

18. The resin composition according to claim 17, wherein said imido alcohol is used in an amount of 20 to 50 equivalent amount % based on the alcoholic components.

19. The resin composition according to claim 18, wherein said polybasic acid is maleic anhydride and said polymeric monomer is styrene.

20. The resin composition according to claim 19, wherein said polybasic acid anhydride and said primary amino-alcohol are used at a ratio of one acid anhydride group in the polybasic acid anhydride to one amino group in the primary amino-alcohol.

21. The resin composition according to claim 20, wherein the total number of the carboxylic grops to the total number of the hydroxy groups in said composition is in the range from 1/1.05 to 1/1.30.

22. The resin composition according to claim 21, wherein said polymeric monomer is used in an amount of 40 to 60 parts by weight based on 100 parts by weight of said imido-modified unsaturated polyester.

* * * * *